United States Patent [19]
Shinoda et al.

[11] 4,371,000
[45] Feb. 1, 1983

[54] ANTI SURGE FLOAT CHAMBER ASSEMBLY

[75] Inventors: Kazuo Shinoda; Keizo Higashigawa; Ken Shiozawa, all of Toyota, Japan

[73] Assignee: Toyota Jidosha Kogyo Kabushiki Kaisha, Toyota, Japan

[21] Appl. No.: 188,831

[22] Filed: Sep. 19, 1980

[30] Foreign Application Priority Data

Feb. 15, 1980 [JP] Japan ................................ 55-17394

[51] Int. Cl.[3] ...................... F16K 31/18; F16K 33/00; F02M 5/02

[52] U.S. Cl. ...................................... 137/434; 261/70; 261/DIG. 50; 137/442; 73/322.5

[58] Field of Search ............... 73/322.5; 137/434, 442, 137/443; 261/70, DIG. 50

[56] References Cited

U.S. PATENT DOCUMENTS

| | | | |
|---|---|---|---|
| 1,995,228 | 3/1935 | Schimanek | 261/70 |
| 2,138,069 | 11/1938 | Nicholas | 137/434 |
| 2,430,719 | 11/1947 | Johnson et al. | 137/434 |
| 3,153,422 | 10/1964 | Marsee et al. | 137/434 |
| 3,263,975 | 8/1966 | Wu | 261/DIG. 50 |
| 3,376,026 | 4/1968 | Fisher | 137/434 |
| 3,719,352 | 3/1973 | Harrison et al. | 261/DIG. 50 |
| 3,875,267 | 4/1975 | Seki et al. | 137/434 |

*Primary Examiner*—George L. Walton
*Attorney, Agent, or Firm*—Stevens, Davis, Miller & Mosher

[57] ABSTRACT

A float chamber is defined within a body, which is also formed with an inlet passage for supplying fluid into the float chamber, and an outlet passage for taking fluid out from the float chamber opening into a lower part of the float chamber. A float is mounted within the float chamber so as to be movable up and down, and acts on a fluid valve for controlling fluid flow into the float chamber through the intake passage, causing the valve to open and close. The shapes of the float and the float chamber are such that the amount of fluid required to be present in the float chamber in order to float the float at the position in which it just causes the valve to be closed, in equilibrium between its weight and the buoyancy force exerted by the fluid, is independent of the angle of tilting of the float chamber within a certain tilting range.

1 Claim, 7 Drawing Figures

ANTI SURGE FLOAT CHAMBER ASSEMBLY

BACKGROUND OF THE INVENTION

The present invention relates to a float chamber and float assembly, and, more particularly, relates to a float chamber and float assembly suitable for a carburetor of an internal combustion engine for an automotive vehicle, which is so constructed as to desirably control the inflow of fluid into the float chamber, even when the automotive vehicle is subjected to sharp acceleration, deceleration, and/or cornering action.

In an automotive vehicle incorporating an internal combustion engine which comprises a carburetor, such a carburetor generally has a float chamber, which is partly filled with fluid fuel such as gasoline, and wherein a float rises up and down by floating on the gasoline within the float chamber, in equilibrium between a downward force exerted by gravity on the mass of the float, and an upward force which is a buoyancy force equal to the weight of a volume of gasoline which is the same as the volume of the float which is below the gasoline surface, i.e. the amount of gasoline displaced by the float.

This float is generally arranged to act upon a valve which controls inflow of gasoline through a gasoline supply passage into the float chamber in such a way that, when the float rises to at least a certain predetermined level within the float chamber, it presses upon the valve so as to close the valve and interrupt further supply of gasoline into the float chamber through the gasoline supply passage; while, on the other hand, when the float is below said certain predetermined position, it releases the valve so as to allow further supply of gasoline through the gasoline supply passage into the float chamber.

Supply of gasoline for the main jet, the idling jet, etc. of the carburetor is typically taken out from a lower part of the float chamber. Thus, as the internal combustion engine of the automotive vehicle operates, withdrawing a flow of gasoline from the gasoline outlet passage, the level of gasoline within the float chamber is maintained substantially constant by the action of the float and the valve cooperating therewith.

However, in prior art float chamber assemblies, a problem has arisen in that if the automotive vehicle is subjected to acceleration force, deceleration force, or turning force, then the fluid surface within the float chamber will become inclined with respect to the float chamber, and, in prior art float chamber and float constructions, this has reduced the buoyancy force exerted upon the float, because the volume of the float which is immersed in the gasoline has become less, assuming that the float is remaining in the above mentioned predetermined position wherein it just closes the valve which controls supply of gasoline through the gasoline inlet passage to the float chamber.

Accordingly, when the vehicle is subjected to such accelerating, decelerating, and/or cornering force, the float has moved downwards within the float chamber, and, accordingly, has opened the valve to allow a greater amount of gasoline to enter into the float chamber than was allowed to enter thereinto when the surface of the gasoline within the float chamber was substantially level with respect thereto.

The presence of this excessive amount of gasoline within the float chamber can be very troublesome. For example, the head or pressure of the gasoline at the gasoline outlet passage of the float chamber will rise in accordance with this excessive amount of gasoline present within the float chamber, and accordingly excess gasoline will disadvantageously be forced out from, for example, the main jet of the carburetor, and will disadvantageously provide an over rich mixture to the internal combustion engine. Further, another problem arises, in that if the carburetor is rather hot there is a danger that the low boiling point components of the excess amount of gasoline within the float chamber will rapidly evaporate at this high temperature, and may cause the so-called 'spewing' phenomenon, wherein a foam of gasoline and gasoline vapor is ejected from an air vent at the top of the float chamber.

This air vent is usually communicated to the intake manifold of the internal combustion engine, for purposes of pollution control and fuel economy. Thus, this spewing may well eject a considerable volume of gasoline and gasoline vapor into the inlet manifold of the internal combustion engine, thus providing an extremely rich mixture thereto. This is very wasteful of gasoline, and furthermore produces large quantities of noxious engine emissions, such as HC, CO, smoke, etc., and, in the worst case, may cause stalling of the internal combustion engine.

SUMMARY OF THE INVENTION

In view of the above considerations relating to the shortcomings of conventional float chamber and float assemblies, one of the objects of the present invention is to provide an improved float chamber assembly wherein, even when the float chamber assembly is subjected to quite severe acceleration or deceleration in a particular direction, excessive inflow of fluid into the float chamber caused by the tilting of the surface of the fluid within the float chamber with respect to the float chamber is effectively prevented, by ensuring that the float does not lose any buoyancy during such tilting of the fluid surface within the float chamber.

Another object of the present invention is to provide a float chamber device, wherein the buoyancy acting upon the float, when the float is in a position just to close the valve which controls input of fluid into the float chamber, is substantially constant, irrespective of the tilting of the fluid surface within the float chamber with respect to the float chamber, when an amount of fluid is present within the float chamber sufficient just to raise the float to the position to close the valve when the fluid surface is horizontal within the float chamber.

A yet further object of the present invention is to provide a float chamber device in which the valve which controls supply of fluid into the float chamber is never subjected to strong force by excessive upward buoyancy of the float caused by an excessive amount of fluid within the float chamber; thus avoiding problems associated with undue wear on this valve, and failure thereof, after a long period of service life of the device.

According to the present invention, these, and other, objects are attained by a float chamber assembly for controlling supply of a fluid, comprising: a body within which are defined a float chamber, a fluid inlet passage, opening into the float chamber, for supplying the fluid into the float chamber, and a fluid outlet passage, opening into a lower part of the float chamber, for taking the fluid out from of the float chamber; a float mounted within the float chamber so as to be movable up and down therein with one degree of freedom; and a fluid valve for controlling fluid flow through the fluid inlet passage, which is acted on by the float so as to be closed when the float rises to at least a predetermined position within the float chamber, and so as to be open when the float is below said predetermined position; wherein the shapes of the float and the float chamber are such that the amount of the fluid required to be present within the float chamber in order to float the float freely at said predetermined position, in substantial equilibrium between substantially only its weight and the upward buoyancy force exerted on the float by the fluid, is independent of the angle of tilting of the float chamber within a certain tilting range on either side of a horizontal tilting axis.

According to such a construction, even when the vehicle incorporating the float chamber is subjected to sudden acceleration, deceleration, or turning force which tends to tilt the fluid surface of the fluid within the float chamber with respect to the float chamber about said horizontal axis, because, whatever the tilting amount of the surface of the fluid within the float chamber, this amount of fluid within the float chamber is just sufficient to float the float at its said predetermined position wherein it just closes the valve, no further fluid will be admitted by the valve from the fluid inlet passage into the float chamber during such tilting. This will be the case, whatever is the angle of tilting of the fluid surface within the float chamber, within said certain tilting range. Thus, when the acceleration or deceleration or turning force upon the vehicle is removed, and the fluid surface within the float chamber returns to a level position with respect thereto, no excess amount of fluid will now be present within the float chamber, and, accordingly, no excess head will be present to drive an excess amount of fluid out from the fluid outlet passage of the float chamber, and thereby supply of over rich mixture to the internal combustion engine of the automotive vehicle in which the float chamber assembly is provided, and the occurrence of the 'spewing' phenomenon, are effectively prevented.

Further, since the level of the fluid surface within the float chamber, according to the effect described above, will thereby never be higher than a desirable level which just closes the valve, the valve is never subjected to strong force by excessive upward buoyancy of the float which would occur if the fluid level within the float chamber were excessively high, and, accordingly, wear and tear upon this valve, and the likelihood of eventual failure thereof, are effectively reduced.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
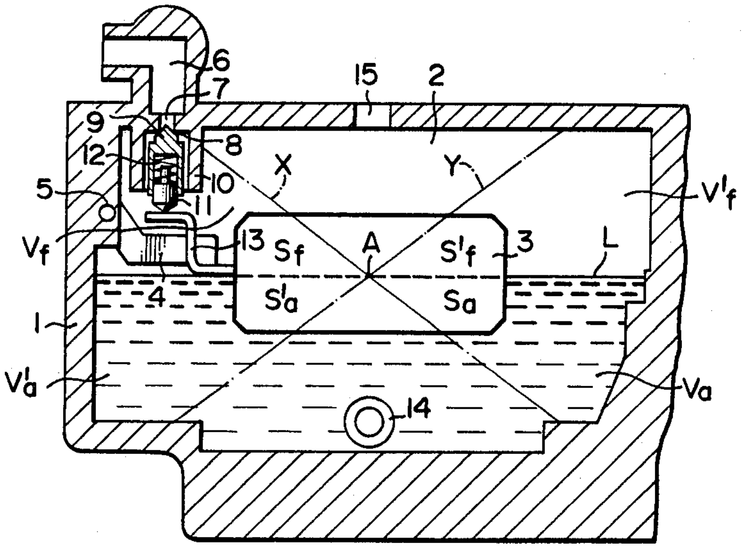
FIG. 1 is a longitudinal sectional view of a first embodiment of the float chamber assembly according to the present invention, showing in section the essential parts thereof.

Referring to FIG. 1, the float chamber assembly herein shown comprises a float chamber body 1, which is formed with a float chamber 2 therein. Within the float chamber 2 there is mounted a float 3, which, in this embodiment, is pivoted to the float chamber body 1, via a pivot arm 4, by a pivot pin 5.

The float chamber body 1, further, is formed with a gasoline inlet passage 6 therein, for supplying gasoline into the float chamber 2 within this float chamber body 1, and at the end of this gasoline inlet passage 6 there is defined a needle valve port 7 opening into the float chamber 2. The opening and closing of the needle valve port 7 are controlled by the end of a needle valve element 9, which coacts with a needle valve seat 8 which is formed around the periphery of the needle valve port 7. The needle valve element 9 is supported within a retaining needle valve sleeve 10, which is integrally formed with the float chamber body 1; and the needle valve element 9 is axially movable within this retaining needle valve sleeve 10, in the upwards and downwards directions in the drawing.

Within a central cylindrical hole in the needle valve element 9 there is supported a needle valve actuating element 11, and between the actuating element 11 and the needle valve element 9 there is provided a compression coil spring 12, for the purpose of buffering action. The lower end of the needle valve actuating element 11 abuts an actuating projection 13 which is mounted on the float pivot arm 4.

Thus, when the assembly comprising the float 3, the float pivot arm 4, and the needle valve actuating projection 13 is pivoted in the clockwise direction about the axis of the float pivot pin 5, the needle valve actuating projection 13 allows the assembly comprising the valve actuating element 11 and the needle valve element 9 to be removed from the valve seat 8 of the valve port 7, and, accordingly, the valve port 7 is opened, thus allowing gasoline to be supplied through the gasoline inlet passage 6 to the interior of the float chamber 2.

On the other hand, when the fluid level in the float chamber 2 rises, the buoyancy of the float 3 ensures that it also will rise, and, accordingly, the assembly comprising the float 3, the float pivot arm 4, and the needle valve actuating projection 13 rotates in the counter clockwise direction about the axis of the float pivot pin 5, and the needle valve actuating projection 13 presses the valve actuating element 11 upwards, so as to press the needle valve element 9 against the valve seat 8 of the needle valve port 7 and close the gasoline inlet passage 6, thereby interrupting further supply of gasoline through the inlet passage 6 to the interior of the float chamber 2, and thereby preventing the gasoline level within the float chamber 2 from rising above a certain limit level L, which is predetermined when the fluid level within the float chamber 2 is horizontal with respect thereto.

A gasoline outlet passage 14 is provided as opening to a lower part of the float chamber 2, for taking out gasoline therefrom for supply to the various jets of the carburetor, and when gasoline is withdrawn through this gasoline outlet passage 14 the level L of gasoline within the float chamber 2 tends to drop. Accordingly, as the float 3 is slightly lowered by this level L dropping, the needle valve element 9 is moved a little away from the needle valve seat 8, thus opening the valve port 7 somewhat and allowing gasoline to be supplied in just enough amount through the gasoline inlet passage 6 into the float chamber 2 to bring the level L of the gasoline within the float chamber 2 back up again to the level L.

At the top of the float chamber 2 there is provided an air vent hole 15, so as to relieve compression of gas therein. According to modern automobile engine design, with the object of reducing escape of gasoline fumes to the atmosphere, and thus with the object of reducing pollution, this float chamber air vent hole 15 is usually communicated to the inlet manifold of the internal combustion engine, although it is not so shown in the drawing. Accordingly, the above mentioned problem of 'spewing' becomes severe, because if spewing of foam composed of gasoline and gasoline vapors through this air vent hole 15 should occur, this foam will be directed into the inlet manifold of the internal combustion engine, and will accordingly cause extremely over rich operation thereof, and may, as explained above, even lead to stalling of the internal combustion engine.

According to the present invention, the shapes of the float chamber 2 and the float 3 are so arranged that, when an amount of fluid as shown in FIG. 1 is present within the float chamber 2, i.e., when an amount of fluid sufficient to bring the level therein up to the level L when the fluid level in the float chamber is horizontal with respect to the float chamber is present therein, then, irrespective of the angle of tilting of the float chamber about a horizontal axis perpendicular to the plane of the drawing paper in FIG. 1, the level at which the float 3 will float within this predetermined amount of gasoline will always keep it substantially exactly at the position wherein the needle valve actuating projection 13 just presses the needle valve element 9 against the valve seat 8 of the valve port 7. In other words, irrespective of the angle of inclination of the fluid surface of the gasoline within the float chamber 2, within a certain range between the lines shown in the drawing by X and Y, the equilibrium position of the float, wherein it is floating in substantial equilibrium between its weight and the upward buoyancy force exerted thereon by the gasoline, is constant.

In the present embodiment, further, this is ensured by the following arrangement. When the float 3 is at its position wherein the needle valve actuating projection 13 is just impelling the valve actuating element 11 and the valve element 9 coupled thereto so as just to close the valve seat 8 of the needle valve port 7, then, whatever is the tilting angle of the surface of the gasoline within the float chamber 2, with respect to the float chamber body 1, this gasoline level always passes through a line through the point A and perpendicular to the plane of the paper in FIG. 1. In other words, when, for example, the gasoline level in the float chamber 2 is inclined as shown by the line X, then the volume Vf of gasoline which is above the horizontal gasoline level L in this condition is substantially equal to the volume Va of gasoline in the level condition of the gasoline surface L which is above the level X of the gasoline surface in this condition. Similarly, when the gasoline surface within the float chamber 2 is inclined as shown by the line Y, for example, the volume V'f of gasoline in this condition which is above the level L of gasoline in the horizontal condition within the float chamber 2, is substantially equal to the volume V'a of gasoline which, in the condition wherein the gasoline level L is horizontal within the float chamber 2, is above the level Y of the gasoline in this inclined condition.

Further, this arrangement is obtained by the shape of the float 3 being such that, when the gasoline level within the float chamber 2 is tilted from the horizontal level shown by L to any level up to the tilted level shown by X, the volume Sf of the float 3 which is submerged by this operation is substantially equal to the volume Sa which is brought from under the surface of the gasoline by this operation, without the position of the float 3 in the float chamber 2 changing, so that the buouancy acting upon the float 3, when it is in the position wherein it just closes the valve seat 8 of the needle valve port 7, is substantially the same, i.e. is equal to its weight. Similarly, when the gasoline level within the float chamber 2 is titled from the horizontal level shown by L to any level up to the tilted level shown by Y, the volume Sf' of the float 3 which is submerged by this operation is substantially equal to the volume Sa' which is brought from under the surface of the gasoline by this operation, without the position of the float 3 in the float chamber 2 changing, so that the buoyancy acting on the float 3, when it is in the position wherein it just closes the valve seat 8 of the needle valve port 7, is substantially the same, i.e. is equal to its weight.

Figure 2:
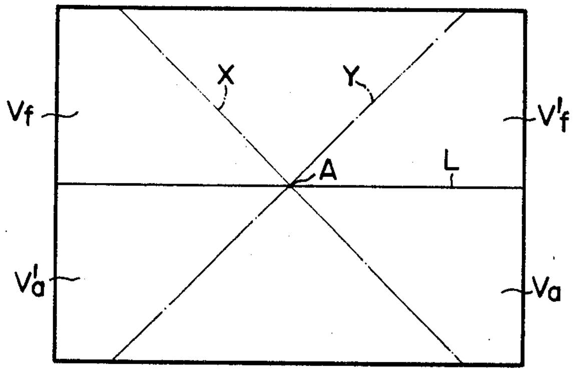
FIGS. 2 and 3 are schematic cross sectional views, taken along the same sectional plane as FIG. 1, of the float chamber, for explanation of the basic principles of the present invention.
Figure 3:
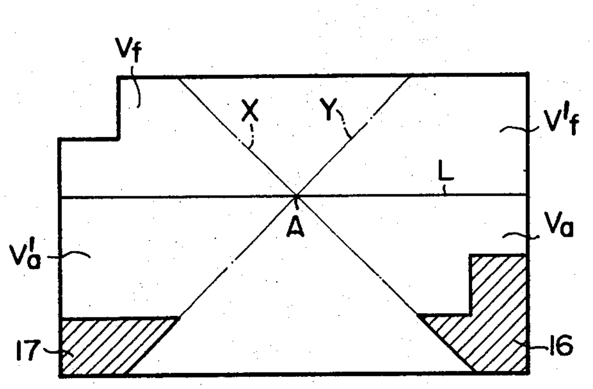
Figure 4:
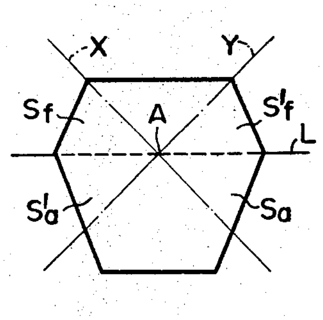
FIGS. 4, 5, 6, and 7 are sectional views, taken along the same plane as FIGS. 1, 2, and 3, through various other floats of float chamber assemblies which are other embodiments of the float chamber assembly according to the present invention, for explanation of the essential principles thereof.
Figure 5:
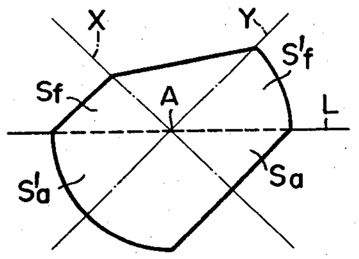
Figure 6:
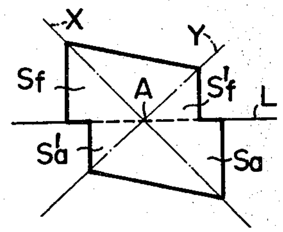
Figure 7:
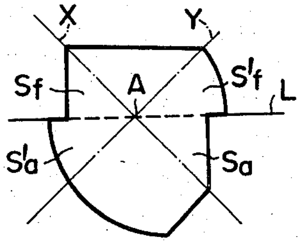

FIGS. 2 and 3 schematically show longitudinal cross sectional shapes for the float chamber 2, as two possible alternative embodiments of the present invention, and both of these are possible shapes for the float chamber 2 such that, when in the horizontal condition the level of gasoline within the float chamber 2 is just at the level L, then when the level of the gasoline within the float chamber is tilted with respect to the float chamber in either direction about a horizontal axis perpendicular to the plane of the drawing paper, with the amount of gasoline remaining within the float chamber remaining constant, then the surface of the gasoline always passes through a horizontal axis through the point A and perpendicular to the drawing paper. Lines X and Y show the extreme ends of the range of tilting about said horizontal axis through the point A and perpendicular to the drawing paper for which this condition is required to hold. When the float chamber 2 is substantially rectangular in cross section, as in the embodiment shown in FIG. 2, it will be required that the level L of gasoline within the float chamber 2 at which the float 3 just closes the valve seat 8 of the needle valve port 7 should be at the half way point therein. In this condition, by symmetry, it is clear that, whatever be the angle of tilting of the gasoline surface within the float chamber 2 about the horizontal axis through the point A, the volume Vf will be equal to the volume Va, or alternatively the volume V'f will be equal to the volume V'a, irrespective of the actual angle of inclination of the gasoline surface with respect to the float chamber.

On the other hand, in the case of the float chamber 2 according to the third embodiment of the present invention which is shown in a cross sectional longitudinal view in FIG. 3, by the provision of the volume adjusting members whose cross sections are shown as 16 and 17 in FIG. 3 within a lower part of the float chamber, it is ensured that, whatever be the angle of inclination of the gasoline level within the float chamber 2 about the axis passing through the point A and perpendicular to the plane of the drawing paper, within the bounds of the lines X in the one tilting direction and the line Y in the other tilting direction, the volume Vf will be equal to the volume Va, or alternatively the volume V'f will be equal to the volume V'a, by symmetry. In other words, the level of gasoline within the float chamber 2 will substantially always pass through said horizontal axis through the point A, without the amount of gasoline in the float chamber 2 changing, irrespective of the angle of inclination of this surface with respect to the float chamber 2.

Further, with regard to the shape of the float 3, when the float is maintained in the position within the float chamber at which it just closes the needle valve seat 8 of the needle valve port 7, and is floating in equilibrium on the level surface of the gasoline within the float chamber 2, the position of the horizontal axis through the point A, defined above, with respect to the float, is determined. Now, according to these embodiments of the present invention, the shape of the float 3 is so arranged that the volume thereof which is below any plane which contains the axis through the point A and which is inclined with respect to the horizontal plane within the range limits defined by the lines X and Y, is always constant, irrespective of the angle of inclination of this plane. This will ensure that the float 3 will float at the same level within the gasoline contained within the float chamber 2, as the gasoline level tilts to and fro within the float chamber 2 and with respect thereto. Thus, for example, the volume Sa shown in any of the embodiments in FIGS. 4, 5, 6, and 7, which comes below the gasoline surface when the gasoline surface in the float chamber is horizontal, and which comes above the gasoline surface when the gasoline surface in the float chamber 2 is inclined as shown by X, is substantially equal to the volume Sf which is above the gasoline surface in the float chamber 2 when the gasoline surface in the float chamber 2 is horizontal, and which is below the gasoline surface in the float chamber 2 when the gasoline surface in the float chamber 2 is tilted. Similarly, for example, the volume Sa' shown in any of the embodiments in FIGS. 4, 5, 6, and 7, which comes below the gasoline surface when the gasoline surface in the float chamber is horizontal, and which comes above the gasoline surface when the gasoline surface in the float chamber 2 is inclined as shown by Y, is substantially equal to the volume Sf' which is above the gasoline surface in the float chamber 2 when the gasoline surface in the float chamber 2 is horizontal, and which is below the gasoline surface in the float chamber 2 when the gasoline surface in the float chamber 2 is tilted.

In summary, when the amount of fuel within the float chamber 2 is just sufficient to raise the float 3 enough just to press the needle valve element 9 against the valve seat 8 of the needle valve port 7, when the gasoline surface within the float chamber 2 is horizontal, then, according to the present invention, as the gasoline surface within the float chamber 2 titls, this will not substantially affect the buoyancy with which it acts on the float 3, and, accordingly, the float 3 will neither tend to rise and put more force on the needle valve element 9 and press it against the valve seat 8 of the needle valve port 7, nor will it tend to lower and move the needle valve element 9 away from the valve seat 8 of the needle valve port 7 and allow more gasoline to enter within the float chamber 2. Thereby, the amount of fluid within the float chamber 2 is always maintained substantially the same, irrespective of acceleration, deceleration, or turning forces acting upon the float chamber assembly, according to the present invention.

Of course, according to the present invention, the only conditions with regard to the shape of the float chamber 2 relate to the parts thereof for which there is a possibility that they should be either above or below the level of fluid within the float chamber, between the extremes of said specified range of tilting thereof. In other words, the present invention is not concerned with the shape of the parts of the float chamber 2 which are either always below the gasoline surface therein, or always above the gasoline surface therein, as the gasoline surface tilts between the said predetermined limits of its tilting range.

The lines X and Y show the maximum amounts of tilting of the gasoline level within the float chamber 2 that need to be considered in the present invention. In practice, it has been found that the inclination of the lines X and Y which is convenient for practical utilisation of the principles of the present invention is within the range 30°-50°.

Although the present invention has been shown and described in terms of several preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

We claim:

1. A float chamber assembly for controlling the supply of a fluid, comprising:

- a body within which are defined a float chamber which provides an effective liquid containing chamber space, a fluid inlet passage opening into the float chamber for supplying the fluid into the float chamber, and a fluid outlet passage opening into a lower part of the float chamber for taking the fluid out from the float chamber;
- a float within the float chamber;
- means to enable the buoyancy force exerted on the float to be independent of the angle of tilting of the float chamber, said means comprising the shape of the float and the float chamber being such that they have each a common point and when a line including said common point is rotated around said point within a substantial angle such as 90 degrees, said line will traverse the same area on opposite sides of said point with respect to both the float and the effective liquid containing chamber space when viewed in a longitudinal cross section;
- the float being supported to be movable up and down in the float chamber with one degree of freedom so that at one position of its movement, said common point on the float coincides with the fluid level of the float chamber;
- and a fluid valve for controlling fluid flow through the fluid inlet passage, which is connected to the float so as to be closed when the float rises up to a position where said common point of the float coincides with that of said float chamber, with the level of fluid in said float chamber being at the level of said common point.

* * * * *